(12) United States Patent
Dworatzek et al.

(10) Patent No.: US 8,955,824 B2
(45) Date of Patent: Feb. 17, 2015

(54) FILTER DEVICE

(71) Applicant: Mann+Hummel GmbH, Ludwigsburg (DE)

(72) Inventors: Klemens Dworatzek, Edingen (DE); Daniela Zinic, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/792,041

(22) Filed: Mar. 9, 2013

(65) Prior Publication Data

US 2013/0233400 A1    Sep. 12, 2013

(30) Foreign Application Priority Data

Mar. 9, 2012  (DE) .......................... 10 2012 004 579

(51) Int. Cl.
| | | |
|---|---|---|
| *F16K 51/00* | (2006.01) | |
| *F16K 31/00* | (2006.01) | |
| *B01D 27/10* | (2006.01) | |
| *B01D 36/00* | (2006.01) | |
| *F02M 37/22* | (2006.01) | |
| *B01D 35/16* | (2006.01) | |
| *B01D 35/153* | (2006.01) | |
| *B01D 27/08* | (2006.01) | |
| *F01M 11/04* | (2006.01) | |

(52) U.S. Cl.
CPC ............ *B01D 27/106* (2013.01); *B01D 36/006* (2013.01); *F02M 37/22* (2013.01); *B01D 35/16* (2013.01); *B01D 35/153* (2013.01); *B01D 27/08* (2013.01); *F01M 2011/0416* (2013.01)
USPC ........ 251/149.4; 251/339; 251/341; 251/346; 251/351; 251/353

(58) Field of Classification Search
CPC .... F01M 11/0408; F16K 31/58; F16K 31/50; F16D 2125/16
USPC ............... 251/149.4, 339, 341, 346, 351, 353
See application file for complete search history.

(56) References Cited

U.S. PATENT DOCUMENTS

| | | | | |
|---|---|---|---|---|
| 2,672,806 | A | * | 3/1954 | Vehige .............................. 454/76 |
| 5,144,978 | A | * | 9/1992 | Brown et al. .................. 137/588 |
| 5,441,234 | A | * | 8/1995 | White et al. ................... 251/144 |
| 6,113,072 | A | * | 9/2000 | Wickett ......................... 251/351 |
| 6,581,905 | B2 | * | 6/2003 | Rafko et al. ................... 251/148 |
| 7,141,166 | B2 | * | 11/2006 | Sugiura et al. ................. 210/234 |

FOREIGN PATENT DOCUMENTS

| | | |
|---|---|---|
| DE | 102008051269 A1 | 4/2010 |
| EP | 1522338 A2 | 4/2005 |
| EP | 1938881 A1 | 7/2008 |

OTHER PUBLICATIONS

German Office Action of DE10 2012 004 579.4 (English translation provided).

* cited by examiner

*Primary Examiner* — John K Fristoe, Jr.
*Assistant Examiner* — Hailey K Do
(74) *Attorney, Agent, or Firm* — James Hasselbeck

(57) ABSTRACT

A fluid filter device (1) includes an opening (14) for draining the fluid (33), a first counter thread (13), a closure element (12) for a fluid-tight closure of the opening screwed in with a thread (11) thereof into the first counter thread (13), a second counter thread (17) into which a connecting element (21) with a thread (22) thereof is screwable for simultaneously unscrewing the closure element (12) from the first counter thread (13) and thereby releasing the opening (14) for draining the fluid (33).

6 Claims, 4 Drawing Sheets

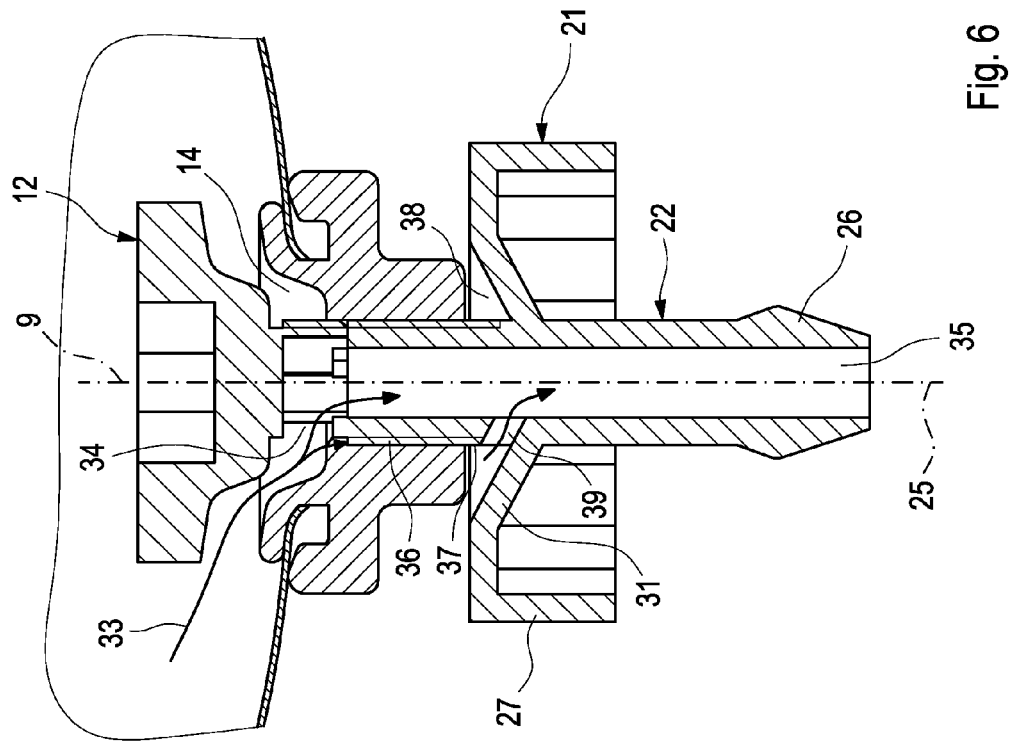
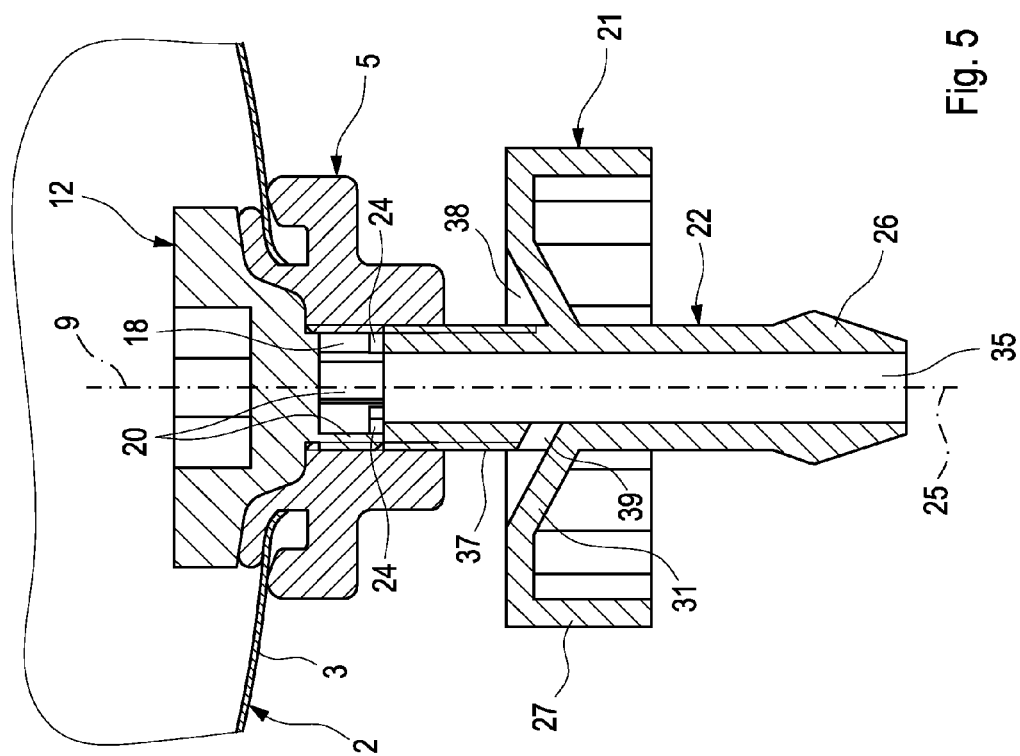

FILTER DEVICE

CROSS-REFERENCE TO RELATED APPLICATIONS

This application claims priority to German patent application DE 102012004579.4, filed in Germany on Mar. 9, 2012.

TECHNICAL FIELD

The present invention relates to a filter device for filtering a fluid.

PRIOR ART

Filter devices in motor vehicles serve in particular for purifying fuels or lubricants. For this purpose, such filter devices usually comprise a filter container that contains a filter element. The filter container has connectors for supplying and discharging the liquid to be filtered or the filtered liquid. The actual filtering process takes place when the liquid to be filtered passes through the filter element in the interior of the filter container. When exchanging the filter element or also when disposing of the entire filter device, it is necessary to drain the liquid that is remaining in it from the filter container. For example, DE 10 2008 051 269 A1 and EP 15 22 338 A2 each describe filter devices with means in order to enable drainage of the liquid from the corresponding filter container.

SUMMARY OF THE INVENTION

It is an object of the present invention to provide an improved filter device which is particularly characterized by a simple configuration as well as a substantially leakage-free drainage of the liquid. A further object of the present invention resides in that an improved method for draining a liquid from a filter device is to be provided.

Accordingly, a filter device for filtering a fluid is proposed, comprising an opening for draining the fluid, a first counter thread, a closure element, and a second counter thread. The closure element is screwed for fluid-tight closure of the opening with a thread thereof into the first counter thread. For simultaneously unscrewing the closure element from the first counter thread and releasing the opening for draining the fluid thereby, a connecting element with a thread thereof is screwable into the second counter thread.

Since the closure element in normal filter operation of the filter device is screw-connected with the first counter thread, a reliable sealing action of the opening for draining the fluid is ensured. Since the closure element is unscrewed simultaneously with screwing in the connecting element, and by doing so the opening for draining the fluid is released, a simple mechanical configuration results and moreover a simple operation. Furthermore, by simultaneously screwing in and unscrewing, leakage of the fluid into the environment is at least reduced. Unscrewing of the closure element from the first counter thread can be done partially or completely.

According to one embodiment, the closure element has a coupling section which is fixedly engageable with a coupling section of the connecting element for unscrewing the closure element. By means of the coupling section, a torque applied to the connecting element for screwing the connecting element into the second counter thread can be transmitted directly onto the closure element in order to unscrew the latter from the first counter thread.

For example, the coupling section of the closure element can have projections extending parallel to the axis of rotation of the thread of the closure element, the projections engageable with corresponding projections of the coupling section of the connecting element. The projections and the corresponding projections thus engage each other in a direction parallel to the axis of rotation. In this way, in the circumferential direction relative to the axis of rotation a form fit results which enables the aforementioned transmission of the torque from the connecting element onto the closure element.

According to a further embodiment, the closure element comprises a sealing section which in a screwed-in state of the closure element seals relative to a corresponding sealing section that delimits the opening. Preferably, the two sealing sections are made of a plastic material. Alternatively or additionally, an O-ring can be used. The sealing action can also be enhanced by utilizing the fluid pressure in filtering operation of the filter device.

Moreover, the closure element can comprise a section which is provided with the thread and in which a penetration is formed through which, in an at least partially unscrewed state of the closure element, the fluid drains after passing the opening. The projections of the closure element can form the section partially or entirely. The penetration is preferably a slot that is formed between two projections defining the coupling section of the closure element and that is open at one end. The penetration can be embodied so as to penetrate the thread itself at least partially, for example, as a round hole or slot in the thread. Alternatively, the penetration can be arranged in a section between the thread and the sealing section. In this case, the penetration can also be formed, for example, is a round hole or slot.

According to a further embodiment, the filter device has moreover a wall with an opening as well as an insert which is inserted into the opening fluid-tightly and forms the opening for draining the fluid. The insert comprises, for example, the corresponding sealing section. The insert can be made of plastic material.

According to one embodiment, the wall is a component of a filter container of the filter device which receives a filter element and comprises connectors for supply and discharge of the fluid to be filtered or the filtered fluid. The term "filter element" means here a filter fabric, filter nonwoven, filter fleece or any other filter structure, for example, a porous material.

According to a further embodiment, the first and second counter threads are each embodied as an inner thread. Accordingly, in this case the thread of the closure element and the thread of the connecting element are each formed as outer threads. However, it is also possible that, for example, the first counter thread is embodied as an inner thread and the second counter thread as an outer thread.

Preferably, the first and second counter threads are arranged coaxially to each other. In this context, "coaxial" refers to the respective axes of rotation of the two counter threads.

According to a further embodiment, the thread of the closure element is irreversibly disengaged from the first counter thread when the connecting element is partially or completely screwed in. Since the completely unscrewed closure element is then in the interior of the container of the filter device, it can therefore not be screwed in again. In this way, a disposable use of the filter device is ensured.

Moreover, a kit with the filter device according to the invention and a connecting element is proposed. The connecting element is screwable with a thread thereof into the second counter thread for simultaneously unscrewing of the closure element from the first counter thread and thereby releasing the opening for draining the fluid.

According to one embodiment, the connecting element comprises a coupling section which can be engaged fixedly with the coupling section of the closure element for unscrewing the closure element. Preferably, the coupling section of the closure element has projections extending parallel to the axis of rotation of the thread of the connecting element which are engageable with the projections of the coupling section of the closure element.

The connecting element can comprise a tubular section which, in a screwed-in state of the connecting element, is in fluidic communication with the opening for draining the fluid. Preferably, the coupling section is formed on one end of the tubular section. On its other end, the tubular section has preferably a connecting possibility for a hose for discharging the drained fluid. Moreover, the tubular section supports, preferably on its outer side and/or on its one end, the thread of the connecting element. Moreover, on the tubular section a ring can be attached which is coaxially arranged thereon. The ring enables a simple manual rotation of the connecting element in order to screw the latter into or unscrew it from the second counter thread in this way.

According to a further embodiment, the connecting element, in particular an element for rotating the connecting element for screwing in and/or unscrewing it from the second counter element, comprises a catch basin, in particular in the form of a depression, for fluid that has escaped between the second counter thread and the thread of the connecting element. In this way, leaking fluid is locally limited. Moreover, an opening in the tubular section of the connecting element in the area of the bottom of the catch basin can be formed by means of which the fluid that has escaped (also referred to as leaked fluid) is guided into the central passage in the tubular section and into the hose.

The fluid is, for example, a liquid, in particular a fuel or lubricant. However, the fluid can also be water or water-based solutions.

According to one embodiment, the filter device is an oil filter. Accordingly, the fluid in this embodiment is an oil.

The filter device is preferably designed as a disposable filter, in particular disposable oil filter. For maintenance purposes, the entire filter device is exchanged wherein first the fluid that is contained in the filter device is drained and, subsequently, the filter device is disposed of.

Moreover, a method for draining a fluid from an opening of a filter device for filtering the fluid is proposed. A closure element that fluid-tightly closes the opening is unscrewed simultaneously with a connecting element being screwed in. Unscrewing of the closure element has the effect that it releases the opening so that the fluid can drain through the opening. The filter device can be the filter device according to the invention.

Advantages that result are: a reliable sealing action of the opening by means of the closure element in filter operation of the filter device, a simple mechanical configuration as well as a simple operation and avoidance of leakage due to simultaneously screwing in and unscrewing.

Here, "simultaneous" is to be understood such that screwing in the connecting element and unscrewing the closure element take place at the same time. Unscrewing of the closure element can be a partial or complete unscrewing action. Accordingly, screwing in the connecting element can also be a partial or complete screwing in action.

According to one embodiment, the closure element for the fluid-tight closure of the opening is screwed with a thread thereof into a first counter thread. The connecting element is then screwed in with a thread thereof into a second counter thread for simultaneous unscrewing of the closure element from the first counter thread.

According to a further embodiment, the closure element comprises a coupling section which is fixedly engaged with a coupling section of the connecting element for unscrewing the closure element.

According to a further embodiment, the thread of the closure element, with partial or complete screwing in of the connecting element, is irreversibly disengaged from the first counter thread.

According to a further embodiment, the filter device and/or a filter element thereof are disposed of after draining the fluid. The filter device is thus utilized as a disposable filter device.

Still further, a use of the filter device according to the invention as a disposable filter, in particular disposable oil filter, is proposed.

Further possible implementations of the invention comprise also combinations, not explicitly mentioned, of features or embodiment variants of the filter device, the kit, the method, or the use described above or in the following in relation to the embodiments. In this context, a person of skill in the art will also add or modify individual aspects as improvements or supplements of the respective basic form of the invention.

Further embodiments of the invention are the subject matter of the dependent claims as well as of the embodiments described in the following. In the following, the invention will be explained in more detail with the aid of embodiments with reference to the attached drawings.

BRIEF DESCRIPTION OF THE DRAWINGS

It is shown in:

FIG. 5: a partial section of FIG. 4 wherein a closure element is in its screwed-in state; and FIG. 6: the view of FIG. 5 wherein the closure element is in its unscrewed state.

In the Figures the same reference characters indicate the same or functionally the same elements, inasmuch as nothing to the contrary is indicated.

DETAILED DESCRIPTION

Figure 1:
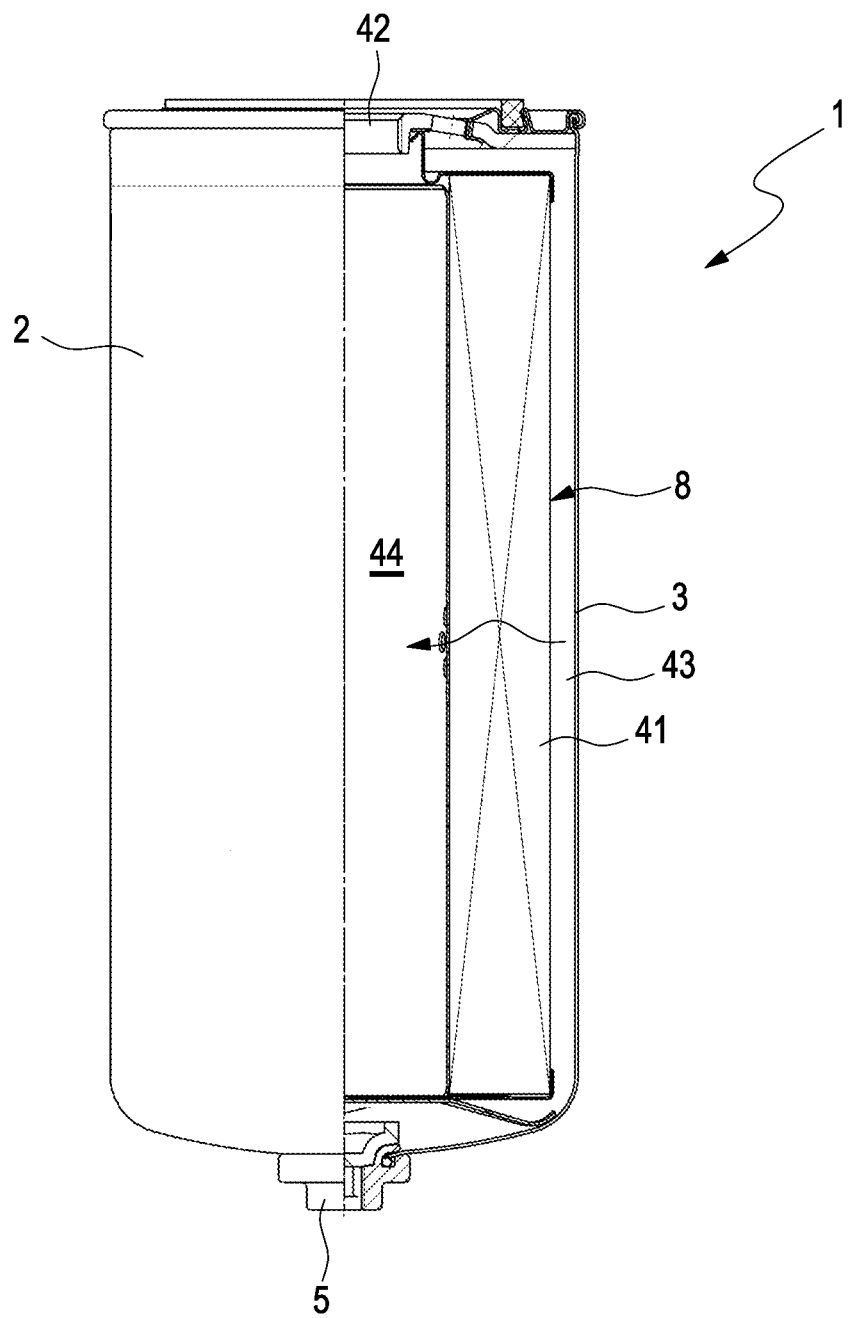
FIG. 1: in a partially broken-away side view a filter device according to one embodiment.
Figure 2:
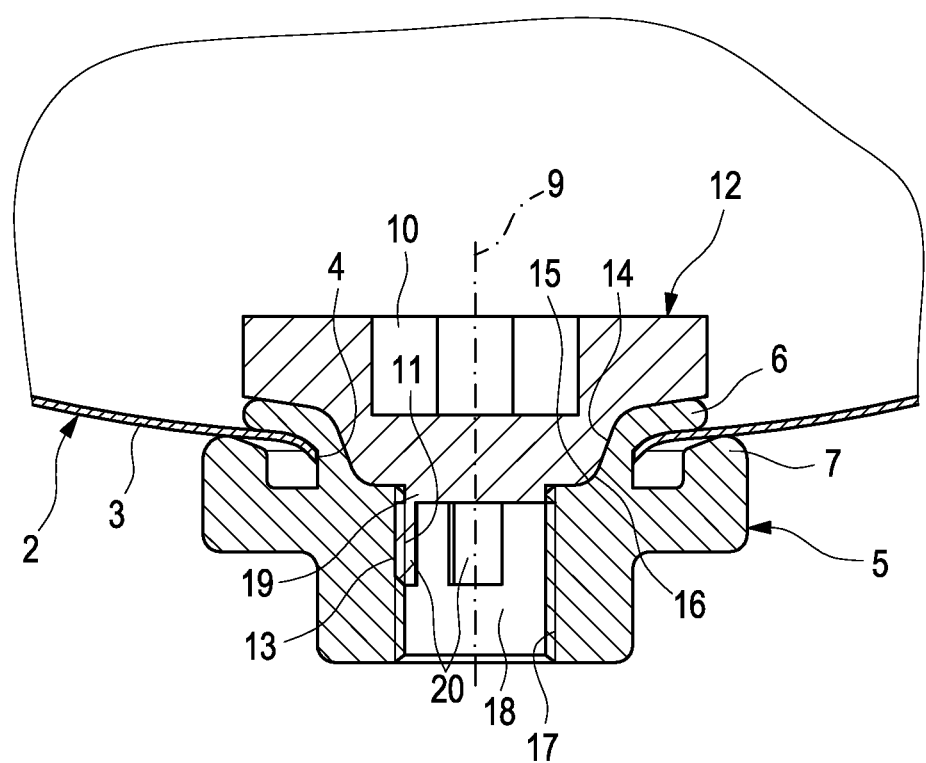
FIG. 2: a partial section of the filter device according to FIG. 1.

FIG. 1 shows in a perspective partial view a filter device 1 according to one embodiment. FIG. 2 shows a partial section of FIG. 1. The filter device 1 will be explained first in the following with reference to FIGS. 1 and 2 in more detail.

The filter device 1 is configured, for example, as a disposable filter, in particular as a disposable oil filter. This means when the filtering capacity of the filter device 1 is exhausted, it is entirely exchanged and disposed of wherein however prior to this the fluid contained in the filter device 1, for example, oil, is drained from the filter device 1. Such filter devices 1 are also referred to as filter cartridges of the disposable type.

The filter device 1 can be embodied in principle for filtering any fluid, i.e., a liquid or a gas. Preferably, the filter device 1 according to the present embodiment is utilized for filtering lubricants or fuels for motor vehicles.

As can be seen with the aid of FIGS. 1 and 2, the filter device 1 comprises a container 2 whose wall 3, for example, on the bottom side of the container 2, has an opening 4. An insert 5 is fluid-tightly inserted into the opening 4. For this purpose, the insert 5 can have circumferentially extending rims 6, 7 which receive the wall 3 surrounding the opening 4 between them and rest fluid-tightly thereon. The insert 5 can be embodied, for example, of plastic material or metal. According to one alternative embodiment, the insert 5 can be formed as a monolithic part together with the wall 3 of the container 2.

As illustrated in FIG. 1, in the container 2 a filter element 8 can be received. The filter element 8 can comprise a bellows 41 of folded filter medium. On a topside of the container 2 an opening 42 is formed. In operation of the filter device 1, the fluid is pumped from a raw side 43 through the bellows (see corresponding arrow) to a clean side 44. From here, the purified fluid exits the filter device through opening 42.

As illustrated in FIG. 2, the insert 5 has also a first counter thread 13. Into the first counter thread 13, in the state illustrated in FIG. 2 which corresponds to the normal filter operation of the filter device 1, a closure element 12 is screwed in. The closure element 12 has for this purpose an appropriate thread 11 which is screwed in by rotation about axis of rotation 9. The closure element 12 can have a key engaging means 10 in order to be screwed into the first counter thread 13.

The closure element 12 closes of the opening 14 for draining the fluid. The opening 14 according to the present embodiment is formed in the insert 5. For the purpose of fluid-tight closure of the opening 14, the insert 5 and the closure element 12 has a sealing section 15 and a corresponding sealing section 16. The closure element 12 can also be made of plastic material so that simply the compression of the sealing sections 15 and 16 in the screwed-in state of the closure element 12 provides a sufficient sealing action. In addition or as an alternative, an O-ring or another sealing means can be provided also in this area for sealing.

The insert 5 has moreover a second counter thread 17. The first and second counter threads 13, 17 are, for example, embodied as inner threads in a passage 18 of the insert 5. The first and second counter threads 13, 17 can be embodied as parts of the same thread. The thread 11 that is, for example, embodied as an outer thread on the section 19 of the closure element 12 that adjoins the sealing section 15 extends into the passage 18 in the state illustrated in FIG. 2. At the free end of the section 19 a coupling section is formed which comprises several, for example three, projections 20.

Figure 3:
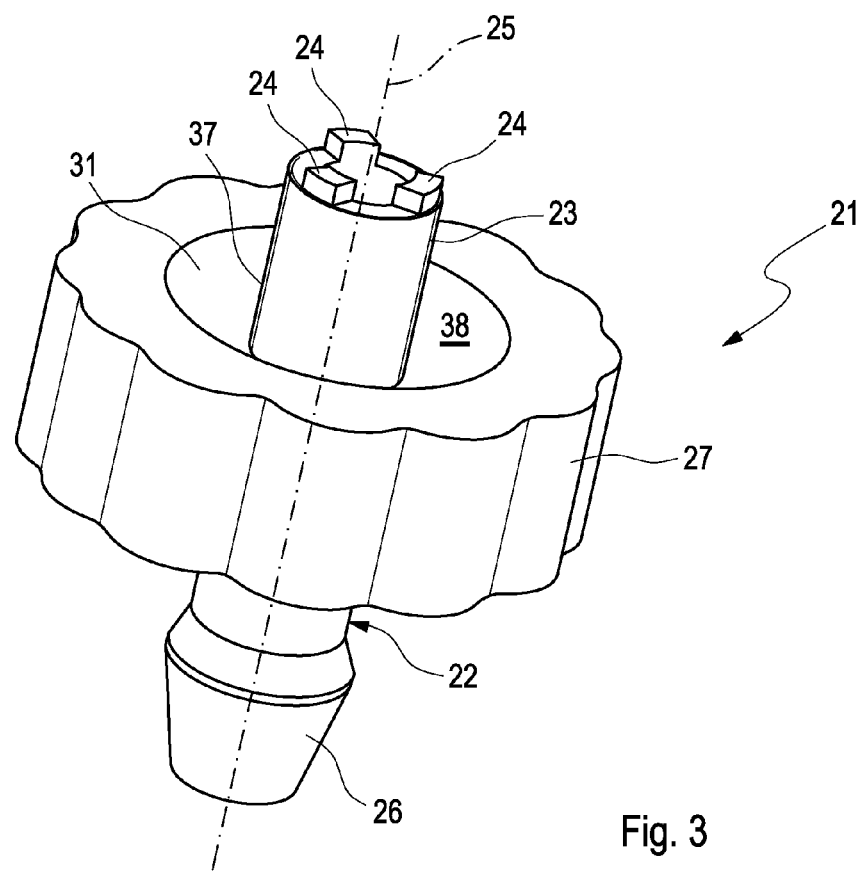
FIG. 3: in a perspective view a connecting element according to one embodiment.
Figure 4:
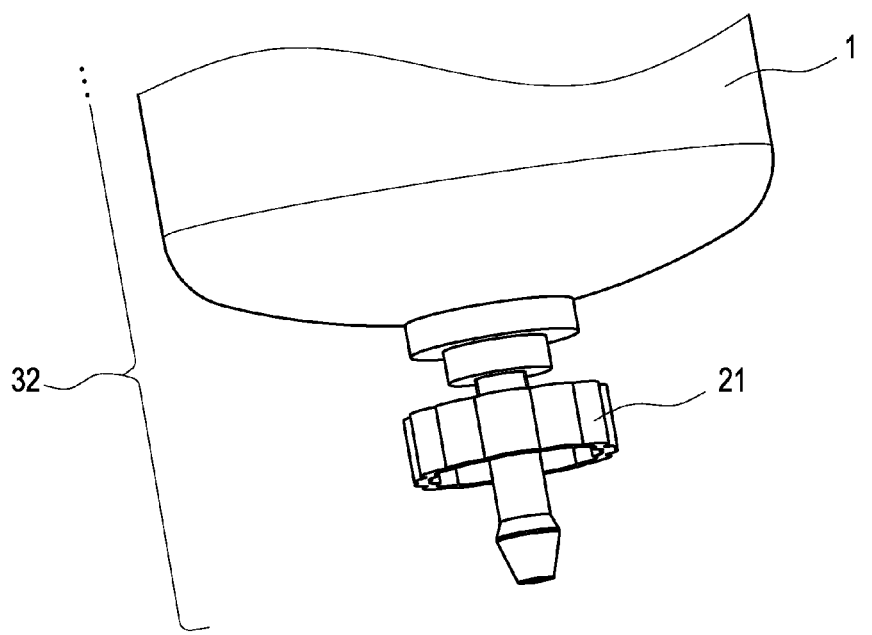
FIG. 4: a kit comprising the filter element of FIG. 1 and the connecting element of FIG. 3.

A connecting element 21 can be screwed into the second counter thread 17 and will be described in more detail in the following with reference to FIGS. 3 and 4. In this context, FIG. 3 shows a perspective view of the connecting element 21. FIG. 4 shows a perspective partial view of a kit comprising the filter device 1 of FIG. 1 as well as the connecting element 21.

The connecting element 21 has a tubular section 22 which supports at one end an outer thread 23.

On one end of the tubular section 22 projections 24 are provided that form a coupling section. The projections 24, for example, three such projections extend parallel to an axis of rotation 25 of the thread 23. Moreover, the projections 24 are distributed about the axis of rotation 25 preferably uniformly and extend according to the present embodiment away from the thread 23.

At the other end the tubular section 22 has a connecting socket 26 for connecting a hose, not illustrated.

The connecting element 21 comprises moreover a profiled ring 27 which is arranged coaxial to the tubular section 22. The ring 27 is connected by means of a circumferential web 31 fixedly to the tubular section 22. The ring 27 is arranged approximately centrally between both ends of the tubular section 22. In place of the ring 27, another type of grip can be used also.

The profiled ring 27 can be gripped easily with one hand in order to screw in the thread 23 of the connecting element 22 into the second counter thread 17, see FIG. 2. The screwed-in state is illustrated in FIG. 4.

In the following, in particular in connection with the FIGS. 5 and 6 which each show a partial section of FIG. 4 in different states of the closure element 12 or the connecting element 21, the interaction between the filter device 1 and the connecting element 21 will be explained in more detail.

In the filter operation of the filter device 1 illustrated in FIG. 2, the closure element 12 seals the opening 14 reliably so that no fluid can escape from the container 2 into the environment. When it is determined that the filter device 1 is to be disposed of, but prior to this the fluid contained in the container 2 is to be drained, the connecting element 21 is used and is inserted with its one end provided with the projections 24 into the passage 18 of the insert 5 until the projections 24 engage the projections 20 of the closure element 12 (see FIG. 5). Subsequently, the profiled ring 27 is manually rotated so that the thread 23 first engages the second counter thread 17 and subsequently is screwed progressively into it. At the same time, the manually applied torque by means of projections 20, 24 is transmitted onto the closure element 12 which is thereby rotated and progressively unscrewed from the first counter thread 13. Subsequently, the fluid 33, see FIG. 6, can flow through opening 14 and subsequently through the slots 34 that are formed between two projections 20 each of the closure element 12 and further through a passage 35 in the tubular section 22 into the hose, not illustrated, which is connected to the connecting socket 26. Then, the drained fluid 33 can be disposed of properly.

In case that during screwing in of the connecting element 21 into the insert 5, a fluid leak 36 between the second counter thread 17 and the thread 23 happens, it is collected in the depression 38 which is delimited by the web 31 and the outer tube wall 37. By means of an opening 39 in the tubular section 22 in the area of the bottom of the depression 38, the fluid leak is transferred into the passage 35.

The threads and counter threads 11, 13, 17, 23 can be designed such that the closure element 12, with partially or completely screwed-in connecting element 21, is released from the counter thread 13 (i.e., the closure element 12 is completely unscrewed from the first counter thread 13). The closure element 12 remains therefore in the container 2 and cannot be easily screwed again into the first counter thread 13. This is however of no consequence because the filter device 1 is to be disposed of anyway after drainage of the fluid.

We claim:
1. A filter device for filtering a fluid, comprising:
a filter container for receiving a filter element therein;
an opening arranged in a wall of the container for draining the fluid from the container;
an annular insert arranged in and extending though the opening and inserted fluid-tightly into the opening, the insert including:
a flow passage extending therethrough from an interior of the container to an exterior of the container;
a first circumferentially extending rim arranged on an interior side of the wall of the container;

a second circumferentially extending rim arranged on an exterior side of the wall of the container;

wherein the wall is received between the first circumferentially extending rim and the second circumferentially extending rim;

a first counter thread arranged in a first thread region on a circumferential wall of the flow passage of the annular insert;

a closure element arranged at an interior of the container, the closure element and engaging into the flow passage of the annular insert, the closure element screwed in for fluid-tight closure of the opening with a closure element thread thereof into the first counter thread at the first thread region of the insert;

a second counter thread arranged in a second thread region of the insert on a circumferential wall of the flow passage of the annular insert;

wherein the second thread region is free and not occupied by the closure element;

wherein the second thread region of the insert is configured and adapted to be screwably engagable with a connecting element having a thread thereof and configured to be engageable with the closure element for simultaneously unscrewing the closure element from the first counter thread by rotation of the closure element and thereby releasing the opening for draining the fluid;

wherein the thread of the closure element, in case of a partial or a complete screwing in of the connecting element, is irreversibly disengaged from the first counter thread.

2. The filter device according to claim 1, wherein the closure element includes a coupling section which is engageable fixedly with a coupling section of the connecting element for unscrewing the closure element.

3. The filter device according to claim 2, wherein the coupling section of the closure element includes projections extending parallel to an axis of rotation of the thread of the closure element, the projections engageable with corresponding projections of the coupling section of the connecting element.

4. The filter device according to claim 1, wherein the closure element includes a sealing section, sealing in the screwed-in state of the closure element relative to a corresponding sealing section that delimits the opening, and comprises a section provided with the thread of the closure element in which a penetration is formed through which, in the at least partially unscrewed state of the closure element, the fluid will drain after passing the opening.

5. A use of the filter device according to claim 1 as a disposable oil filter.

6. A method for draining a fluid from an opening of a filter device, the filter device comprising:

an opening in the wall of the filter device for draining the fluid;

a first counter thread;

a closure element which is screwed in for fluid-tight closure of the opening with a closure element thread thereof into the first counter thread of an annular insert;

a second counter thread of the annular insert into which a connecting element with a thread thereof is screwable for simultaneously unscrewing the closure element from the first counter thread and thereby releasing the opening for draining the fluid;

the method comprising:

fluid tightly closing the opening with the closure element;

simultaneously unscrewing the closure element from the opening when screwing in the connecting element;

the screwing in the connecting element irreversibly disengaging the closure element thread of the closure element from the first counter thread;

wherein the closure element releases the opening and the fluid is drained through the opening.

\* \* \* \* \*